(12) United States Patent
Rosen et al.

(10) Patent No.: US 9,576,492 B2
(45) Date of Patent: Feb. 21, 2017

(54) COLLISION MITIGATION SYSTEMS WITH ADJUSTABLE TRIGGER WIDTH

(71) Applicant: Autoliv Development AB, Vårgårda (SE)

(72) Inventors: Erik Rosen, Alingsas (SE); Benny Nilsson, Alingsas (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/891,801

(22) PCT Filed: May 21, 2013

(86) PCT No.: PCT/SE2013/050570
§ 371 (c)(1),
(2) Date: Nov. 17, 2015

(87) PCT Pub. No.: WO2014/189415
PCT Pub. Date: Nov. 27, 2014

(65) Prior Publication Data
US 2016/0125738 A1    May 5, 2016

(51) Int. Cl.
*G08G 1/16* (2006.01)
*B60Q 5/00* (2006.01)
*B60T 7/22* (2006.01)

(52) U.S. Cl.
CPC ............... *G08G 1/166* (2013.01); *B60Q 5/006* (2013.01); *B60T 7/22* (2013.01)

(58) Field of Classification Search
CPC ............ G08G 1/166; B60Q 5/006; B60T 7/22
See application file for complete search history.

(56) References Cited

U.S. PATENT DOCUMENTS

| | | | |
|---|---|---|---|
| 6,035,053 A | 3/2000 | Yoshioka et al. | |
| 6,853,919 B2 * | 2/2005 | Kellum | B60R 21/013 180/167 |
| 8,589,061 B2 * | 11/2013 | Bengtsson | G08G 1/16 180/275 |
| 9,007,198 B2 * | 4/2015 | Gunaratne | G08G 1/163 340/439 |

(Continued)

FOREIGN PATENT DOCUMENTS

EP    2 081 168 A2    7/2009

OTHER PUBLICATIONS

PCT International Search Report—Mar. 10, 2014.

*Primary Examiner* — Todd Melton
(74) *Attorney, Agent, or Firm* — Brinks Gilson & Lione

(57) ABSTRACT

A vehicle collision mitigation system (2) and method having a detecting device (3) and a control unit (4). The detecting device (3) being arranged to detect a certain field of view (6) defining a trigger area having an adjustable trigger width that is defined by trigger borders (9a, 9b; 10a, 10b) and is adjustable between a minimum trigger width ($w_{min}$) and a maximum trigger width ($w_{max}$). The collision mitigation system (2) is arranged to issue a system trigger signal at least in dependence of an object being determined to at least partly being present within the trigger borders if a collision is predicted to occur. The adjustable trigger width (w) is adjustable in dependence of the number of system trigger signals that have been issued during a certain time period.

12 Claims, 2 Drawing Sheets

(56) References Cited

U.S. PATENT DOCUMENTS

| | | |
|---|---|---|
| 2004/0239490 A1 | 12/2004 | Chilba et al. |
| 2005/0030378 A1 | 2/2005 | Stiller |
| 2006/0092073 A1 | 5/2006 | Boecker et al. |
| 2007/0069873 A1 | 3/2007 | Kudo |
| 2008/0042814 A1* | 2/2008 | Hurwitz ................ B60Q 9/008 340/435 |
| 2008/0181461 A1 | 7/2008 | Saito et al. |

* cited by examiner

COLLISION MITIGATION SYSTEMS WITH ADJUSTABLE TRIGGER WIDTH

CROSS REFERENCE TO RELATED APPLICATIONS

This application claims priority to PCT/SE2013/050570, filed on May 21, 2013.

FIELD OF THE INVENTION

The present invention relates to a vehicle collision mitigation system including a detecting device and a control unit. The detecting device is arranged to detect a certain field of view forming a trigger area having an adjustable trigger width that is defined by trigger borders. The adjustable trigger width is adjustable between a minimum trigger width and a maximum trigger width. The collision mitigation system is arranged to issue a system trigger signal at least in dependence of an object being determined to at least partly being present within the trigger borders.

The present invention also relates to a method for a vehicle collision mitigation system. The method includes the step of detecting a certain field of view, an adjustable trigger width being defined by trigger borders within the field of view. The adjustable trigger width is adjustable between a minimum trigger width and a maximum trigger width.

BACKGROUND

Today, some vehicles are provided with collision mitigation systems or collision avoidance systems that includes a radar and vision sensor arrangement. These systems are arranged to detect moving objects such as vehicles and pedestrians as well as stationary objects such as roadway structures ahead in the traveling path of the vehicle.

As a result, such a system may provide a safety action in the form of for example a warning and/or automatic braking when it is determined that the possibility of a collision between the vehicle and a detected object has exceeded a threshold.

U.S. Pat. No. 6,035,053 discloses a moving object recognizing system arranged for detecting objects, where the transverse velocity of the object is taken into account in order to decrease the number of alarms.

For a typical previously known collision mitigation system, for example as described in U.S. Pat. No. 6,035,053, a pedestrian who is going to cross a vehicle's traveling path ahead of the vehicle may rush out into the road, which requires detection well in advance. For a detected pedestrian, being outside the vehicle's traveling path, it may be decided whether it is likely that the pedestrian will cross the traveling path in such a way that there is a possibility of collision. Such a decision may be made before the pedestrian appears in the vehicle's traveling path.

However, this may cause unnecessary safety actions, for example in form of warnings and braking, which in turn themselves may cause accidents, since it is difficult to determine whether a pedestrian approaching the vehicle's traveling path in fact will enter the vehicle's traveling path such that a collision will occur, or if the pedestrian will stop before a collision occurs.

Early decisions regarding a safety action give high safety but may result in many unnecessary safety actions. Late decisions give less unnecessary safety actions, but offer limited time to brake and warn.

Furthermore, a system which has been factory tuned to operate well in areas with few pedestrians, may cause a high number of activations in areas with a lot of pedestrians. There are thus different needs in different situations.

A collision mitigation system with many unnecessary safety actions will at least constitute a disturbance, and may also be a potential danger.

Also, it may be desired to have a certain trigger rate regarding one or several safety actions in order to have a collision mitigation system which provides confirmation of its existence and functionality.

It is therefore an object of the present invention to provide a collision mitigation system where the number of activations is adjusted in order to acquire a more reliable and usable collision mitigation system of this type, while maintaining a desired trigger rate. In this context, initially a trigger rate is preferably factory set.

SUMMARY AND INTRODUCTORY DESCRIPTION

The above referenced object is achieved by a vehicle collision mitigation system in accordance with this invention having a detecting device and a control unit. The detecting device is arranged to detect a certain field of view forming a trigger area having an adjustable trigger width that is defined by trigger borders. The adjustable trigger width is adjustable between a minimum trigger width and a maximum trigger width. The collision mitigation system is arranged to issue a system trigger signal at least in dependence of an object being determined to at least partly being present within the trigger borders. The adjustable trigger width is adjustable in dependence of the number of system trigger signals that have been issued during a certain time period.

The object is also achieved by means of a method for a vehicle collision mitigation system. The method includes the step of detecting a certain field of view, an adjustable trigger width being defined by trigger borders within the field of view. The adjustable trigger width is adjustable between a minimum trigger width and a maximum trigger width.

The method further includes the step of adjusting the trigger width in dependence of the number of system trigger signals that have been issued during a certain time period. Each system trigger signal is issued at least in dependence of an object being determined to at least partly being present within the trigger borders.

According to an example of the present invention, the vehicle collision mitigation system is arranged to maintain a desired trigger rate by adapting the adjustable trigger width based on the vehicle's total driving time as well as the number and timing of earlier trigger occasions according to:

$$w(t_{tot} > t_n) = f(t_{tot}, t_1, t_2, \ldots, t_n).$$

Here, w is the adjustable trigger width, $t_i$ is the timing of the i:th trigger occasion, n is the total number of trigger occasions at the total driving time, $t_{tot}$ is the total driving time and f is a pre-determined, multi-variable function that depends on the timing of previous trigger occasions and the total driving time.

According to another example, the adjustable trigger width is adapted based on a predetermined maximum past time period as well as the number and timing of earlier trigger occasions. The maximum past time period is equal to the desired time between each trigger occasion, the adjustable trigger width being adjusted according to:

$$w(t_{tot} > t_n) = w_{prev} + g(t_{tot}, t_p, t_{p+1}, \ldots, t_n).$$

Here, w is the adjustable trigger width, $w_{prev}$ is the value of the adjustable trigger width w at the latest update, $t_i$ is the timing of the i:th trigger occasion, p is the first trigger during the maximum past time period, T, $t_{tot}$ is the total driving time and g is a pre-determined, multi-variable function that depends on the timing of all previous trigger occasions that occurred in the maximum past time period and the total driving time.

Other examples are evident from the description.

A number of advantages are obtained by the present invention. Mainly, a desired trigger rate may be achieved regardless of driving style and context by adjusting system parameters based on previous system trigger occasions. This is preferable, since it optimizes driver comfort and provides real-life benefit, the number of trigger occasions being adjusted to not be disturbing while still providing confirmation of its existence and functionality.

The present invention aims to automatically adapt activation thresholds based on previous activations as well as a desired trigger rate.

BRIEF DESCRIPTION OF THE DRAWINGS

The present invention will now be described more in detail with reference to the appended drawings, where.

DETAILED DESCRIPTION

Figure 1:
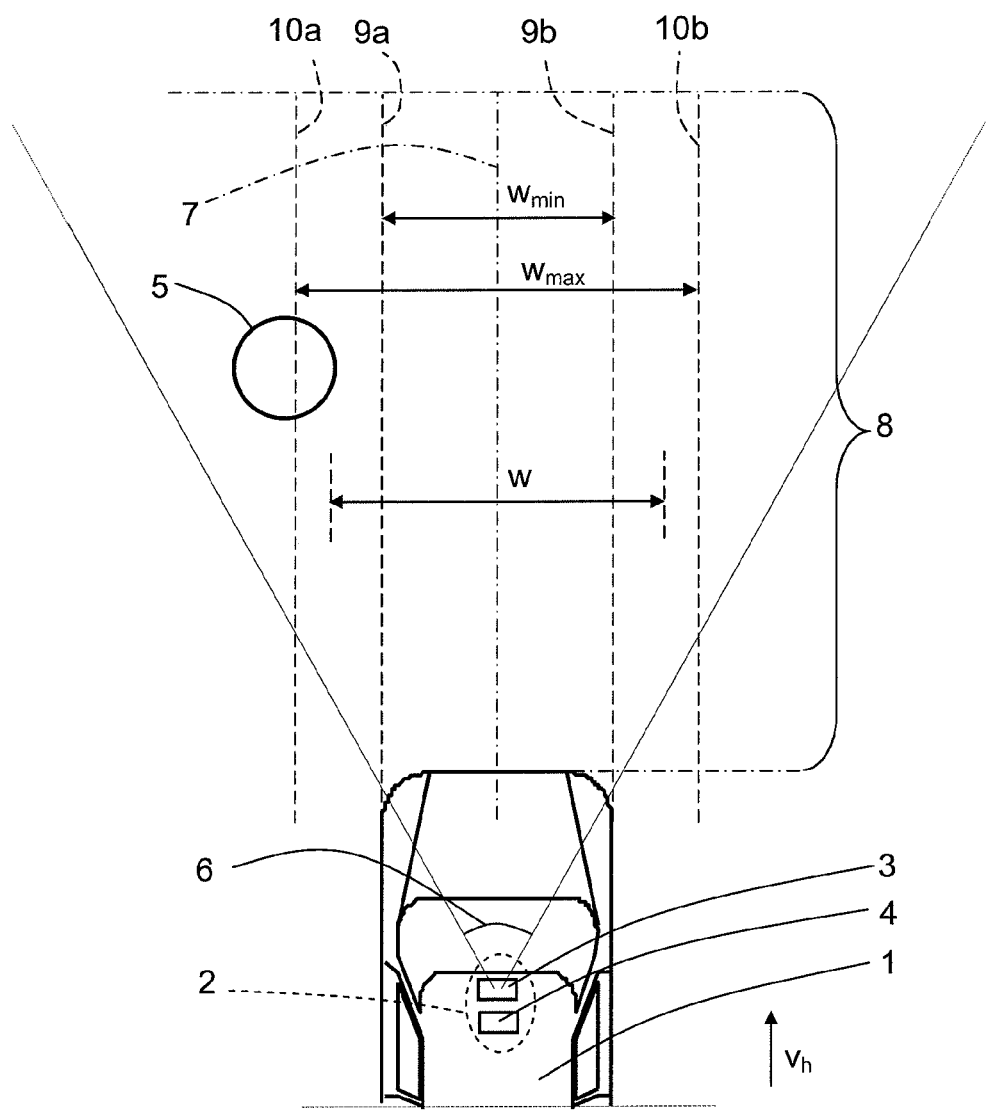
FIG. 1 shows a schematic top view of a vehicle during normal running.

With reference to FIG. 1, a vehicle 1 having a collision mitigation system 2, which in turn includes a camera arrangement 3 and a processing unit 4. The vehicle 1 is moving with a certain vehicle velocity, $v_h$, and there is an object 5 present in the vicinity of the vehicle's path, where the object 5 falls within a field of view 6 of the camera arrangement 3, the field of view 6 existing around a symmetry line 7. The object is within a distance 8 from the vehicle that corresponds to a maximum time to collision $TTC_{max}$, where $TTC_{max}$ indicates the maximum time to an impact that is being considered by the collision mitigation system 2.

Furthermore, there is a trigger area defined by the field of view 6, being defined by trigger borders 9a, 9b; 10a, 10b defining a trigger width $w_{min}$, $w_{max}$.

If a collision is predicted to occur with an object at least partly present in the trigger area, the collision mitigation system 2 issues a system trigger signal that is arranged to start a predetermined safety action, such as a warning or automatic braking, if the following conditions are fulfilled:

1. Collision predicted to occur;
2. Predicted $TTC<TTC_{max}$;
3. At least a part of the object within the trigger area; and
4. Insufficient or limited driver action.

The first condition, a collision being predicted to occur, does not necessarily mean that a collision is imminent, merely that an object that may be relatively distant is on a predicted collision course.

With highly functioning sensor systems, sensor related errors will seldom cause system trigger occasions. Examples of such errors are:

Ghost detections,
Shadows,
Mirror images,
Steam,
Posts, and
Wrong pedestrian position and velocity.

At a trigger occasion, a system trigger signal is issued.

All the errors but the last constitute ghost detections, while the last error constitutes a tracking error.

If system trigger occasions rarely are due to sensor related errors, system trigger occasions will only occur for pedestrians in danger of a collision. Since incidents and accidents with pedestrians are rare for most drivers and driving contexts, this will normally lead to very few system trigger occasions in a vehicle life-time. However, in areas with a lot of pedestrians in motion, such as a very large city, and areas where other sources for unnecessary safety actions according to the above are more common, it is desired that the number of undesired system trigger occasions is reduced to a minimum.

This could be achieved by only triggering the system if a collision is unavoidable. However, this may lead to a reduced protection level of the collision mitigation system, since only limited time would be available for reducing the speed. If all cars in all driving contexts were designed in such a restrictive way, the protection level of the collision mitigation system would be limited. Further, most drivers would never experience a system activation. Hence, this would not lead to optimal driver comfort or real-life benefit.

As shown in FIG. 1, there are trigger borders which are adjustable between an inner limit, with minimum trigger borders 9a, 9b having a minimum trigger width $w_{min}$, and an outer limit, with maximum trigger borders 10a, 10b having a maximum trigger width $w_{max}$.

Between the limits $w_{min}$, $w_{max}$ defined above, the trigger borders are adjustable, such that an adjustable trigger width w is adjustable between the minimum trigger width $w_{min}$ and the maximum trigger width $w_{max}$.

According to the present invention, the adjustable trigger width w is adjustable in dependence of the number of system trigger occasions that have occurred during a certain time period, and thus in dependence of the number of system trigger signals that have been issued during said certain time period.

According to a first example, a desired trigger rate R can be maintained by adapting the adjustable trigger width w based on the vehicle's total driving time $t_{tot}$ as well as the number and timing of earlier trigger occasions according to:

$$w(t_{tot}>t_n)=f(t_{tot},t_1,t_2,\ldots,t_n), \qquad (1)$$

where $t_i$ is the timing of the i:th trigger occasion, n is the total number of trigger occasions at the total driving time $t_{tot}$, and f is a pre-determined, multi-variable function that depends on the timing of previous trigger occasions and the total driving time $t_{tot}$.

According to a second example, a desired trigger rate R induces a time scale T=1/R that is equal to the desired time between each trigger occasion. In this example, the adjustable trigger width w is not based on the total driving time $t_{tot}$, but on a predetermined maximum past time period T, that is equal to the desired time between each trigger occasion according to the above. The adjustable trigger width w is then written as:

$$w(t_{tot}>t_n)=w_{prev}+g(t_{tot},t_p,t_{p+1},\ldots,t_n), \qquad (2)$$

where $w_{prev}$ is the value of the adjustable trigger width w at the latest update, $t_i$ is the timing of the i:th trigger occasion, p is the first trigger occasion during the maximum past time period T, $t_{tot}$ is the total driving time and g is a predetermined, multi-variable function that depends on the timing of all previous trigger occasions that occurred in the maximum past time period T and the total driving time $t_{tot}$.

As an example of the above equation (2), $t_{tot}$=10 years and T is ½ year running continuously in the form of a window. If today is July $1^{st}$, and $t_p$ is trigged on January $3^{rd}$, then the previous trigger occasion $t_{p-1}$ is trigged before January $1^{st}$. All the trigger occasions $t_p$, $t_{p+1}$, ..., $t_n$ have thus occurred during the time T.

As an example of a change rate, if there have been no system trigger occasions during the maximum past time period T, the adjustable trigger width w is increased linearly in time with a change rate $\Delta w/T$ until next trigger occasion or $w_{max}$ is reached, where $\Delta w=w_{max}-w_{min}$.

Furthermore, if two or more system trigger occasions have occurred within the maximum past time period T, w is decreased by $(1-\Delta t/T)*\Delta w*k_w$, where $\Delta t$ is the time between the last two system trigger occasions and $k_w$ is a positive constant less than or equal to one.

In this example, the algorithm is defined by the parameters:
A desired trigger rate R
Minimum trigger width $w_{min}$
Maximum trigger width $w_{max}$
A real constant $0<k_2\leq 1$ The trigger widths 9a, 9b; 10a, 10b are in the examples above shown to be symmetrically arranged around the symmetry line 7. This is however not necessary, and the adjustable trigger width w may be unevenly applied at the different sides if suitable.

The present invention aims to provide a desired trigger rate regardless of driving style and context by adjusting system parameters based on previous system trigger occasions. This is preferable, since it optimizes driver comfort and real-life benefit. A trade-off is provided between early trigger occasions and late trigger occasions, where the trade-off is adaptive.

If an initial trade-off has been made, with very few system trigger occasions as a result, the trade-off could be further adjusted such that the number of trigger occasions is not disturbing while still providing confirmation of its existence and functionality.

Not only the trigger width w may be an adjustable parameter that is taken into account, but also further adjustable parameters may be used. Examples of such further adjustable parameters are estimated time or distance to collision with an object 5 and/or lateral distance to an object 5, measured in time or in distance. These further adjustable parameters are also adjustable in dependence of the number of system trigger signals that have been issued during a certain time period.

Figure 2:
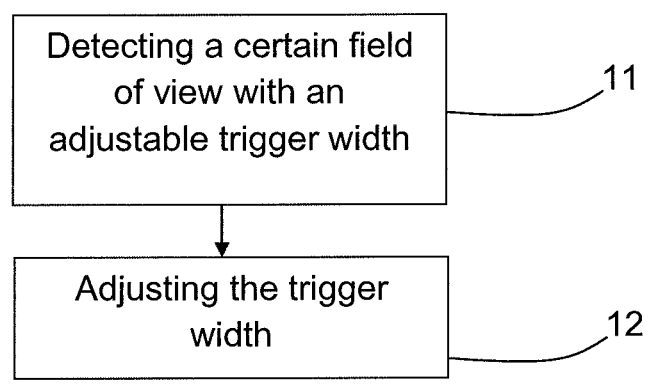
FIG. 2 shows a flow chart of a method according to the present invention.

With reference to FIG. 2, the present invention also relates to a method for a vehicle collision mitigation system 2, the method including the step:

11: detecting a certain field of view 6, an adjustable trigger width w being defined by trigger borders 9a, 9b; 10a, 10b within the field of view 6. The adjustable trigger width w is adjustable between a minimum trigger width $w_{min}$ and a maximum trigger width $w_{max}$.

The method further includes the step of:

12: adjusting the trigger width w in dependence of the number of system trigger signals that have been issued during a certain time period. Each system trigger signal is issued at least in dependence of an object being determined to at least partly being present within the trigger borders 9a, 9b; 10a, 10b.

The present invention is not limited to the examples above, but may vary freely within the scope of the appended claims. For example, the collision mitigation system described has been illustrated with respect to pedestrians, but of course it is valid for animals, other vehicles such as passenger cars and bicycles etc.

The camera arrangement is only an example of a suitable forward detecting device, for example, a radar arrangement, a LIDAR or similar laser devices could be used instead, as well as combinations of these. Acoustic arrangements are also conceivable.

An issued system trigger signal may be arranged to cause one or several actions being taken, for example automatic braking, automatic horn signal and warning signals in the vehicle, acoustic and visual as well as tactile.

An example of a minimum trigger width $w_{min}$ is the vehicle's own width, but it could of course both exceed or fall below this value. An example of a maximum trigger width $w_{max}$ is one meter wider at each side of the vehicle than the minimum trigger width $w_{min}$.

The collision mitigation system 2 is typically active between 7 km/h to 70 km/h. These figures are only an example, and should not be regarded as limiting in any ways; many other speed windows are possible for the mitigation system 2 being active. It could even be active for all speeds.

While the above description constitutes the preferred embodiment of the present invention, it will be appreciated that the invention is susceptible to modification, variation and change without departing from the proper scope and fair meaning of the accompanying claims.

The invention claimed is:

1. A vehicle collision mitigation system comprising a detecting device and a control unit, the detecting device being arranged to detect a certain field of view, the field of view including a trigger area having an adjustable trigger width that is defined by a plurality of trigger borders, where the adjustable trigger width is adjustable by the control unit between a minimum trigger width and a maximum trigger width, where the collision mitigation system is arranged to issue a system trigger signal at least in dependence of an object being determined to at least partly being present within the trigger borders, wherein the adjustable trigger width is adjustable in dependence of the number of system trigger signals that have been issued during a certain time period.

2. A vehicle collision mitigation system according to claim 1, further comprising in that the system trigger signal is arranged to cause one or more of the following actions to be taken:
an automatic braking,
an automatic horn signal, and
a warning signals in the vehicle, in the form of at least one of an acoustic signal, a visual signal, and a tactile signal.

3. A vehicle collision mitigation system according to claim 1 further comprising in that the collision mitigation system is arranged to issue the system trigger signal if each of the following conditions are fulfilled:
a collision is predicted to occur;
a predicted time to collision, is less than a maximum time to collision,
at least a part of the object is within the trigger area; and
insufficient, limited or no driver action has occurred.

4. A vehicle collision mitigation system according to claim 1 further comprising in that the vehicle collision mitigation system is arranged to maintain a desired trigger rate by adapting the adjustable trigger width based on the vehicle's total driving time as well as the number and timing of earlier system trigger signals according to:

$$w(t_{tot}>t_n)=f(t_{tot},t_1,t_2,\ldots,t_n),$$

where w is the adjustable trigger width,
$t_i$ is the timing of the i:th trigger signal,
n is the total number of trigger signals at the total driving time,
$t_{tot}$ is the total driving time, and
f is a pre-determined, multi-variable function that depends on the timing of previous trigger signals and the total driving time.

5. A vehicle collision mitigation system according to claim 1 further comprising in that the vehicle collision mitigation system is arranged to maintain a desired trigger rate by adapting the adjustable trigger width based on a predetermined maximum past time period as well as the number and timing of earlier trigger signals, the maximum past time period being equal to the desired time between each trigger signal, the adjustable trigger width being adjusted according to:

$$w(t_{tot}>t_n)=w_{prev}+g(t_{tot},t_p,t_{p+1},\ldots,t_n),$$

where w is the adjustable trigger width,
$w_{prev}$ is the value of the adjustable trigger width, w, at the latest update,
$t_i$ is the timing of the i:th trigger signal occasion,
p is the first trigger signal during the maximum past time period,
$t_{tot}$ is the total driving time and g is a pre-determined, multi-variable function that depends on the timing of all previous trigger signals that occurred in the maximum past time period and the total driving time.

6. A vehicle collision mitigation system according to claim 1 further comprising in that the collision mitigation system also is arranged to issue a system trigger signal in dependence of at least one of the following further parameters:
an estimated time or distance to collision with an object, and
a lateral distance to an object measured in either time or distance, where the further parameters are adjustable in dependence of the number of system trigger signals that have been issued during a certain time period.

7. A vehicle collision mitigation system according to claim 1, further comprising wherein the trigger borders are defined by lines parallel with the longitudinal symmetry line of the vehicle and the adjustable trigger width is the distance between the trigger borders.

8. A method for a vehicle collision mitigation system, the method comprising the step:
detecting a certain field of view, determining an adjustable trigger width being defined by trigger borders within the field of view, where the adjustable trigger width is adjustable between a minimum trigger width and a maximum trigger width,
adjusting the trigger width in dependence of the number of system trigger signals that have been issued during a certain time period, each system trigger signal being issued at least in dependence of an object being determined to at least partly being present within the trigger borders.

9. A method according to claim 8, in that the method further comprises the step of maintaining a desired trigger rate by adapting the adjustable trigger width based on the vehicle's total driving time as well as the number and timing of earlier trigger signals according to:

$$w(t_{tot}>t_n)=f(t_{tot},t_1,t_2,\ldots,t_n),$$

where w is the adjustable trigger width,
$t_i$ is the timing of the i:th trigger signal,
n is the total number of trigger signals at the total driving time,
$t_{tot}$ is the total driving time, and
f is a pre-determined, multi-variable function that depends on the timing of previous trigger signals and the total driving time.

10. A method according to claim 8, in that the method further comprises the step of maintaining a desired trigger rate by adapting the adjustable trigger width based on a predetermined maximum past time period as well as the number and timing of earlier trigger occasions signals, the maximum past time period being equal to the desired time between each trigger occasion signals, the adjustable trigger width being adjusted according to:

$$w(t_{tot}>t_n)=w_{prev}+g(t_{tot},t_p,t_{p+1},\ldots,t_n),$$

where w is the adjustable trigger width,
$w_{prev}$ is the value of the adjustable trigger width, w, at the latest update,
$t_i$ is the timing of the i:th trigger signal,
p is the first trigger signal during the maximum past time period,
$t_{tot}$ is the total driving time, and
g is a pre-determined, multi-variable function that depends on the timing of all previous trigger signals that occurred in the maximum past time period and the total driving time.

11. A method according to claim 8, in that the method further comprises the step of issuing a system trigger signal in dependence of at least one of the following further parameters
estimated time or distance to collision with an object, and
a lateral distance to an object measured in either time or distance, where the further parameters are adjustable in dependence of the number of system trigger signals that have been issued during a certain time period.

12. A method for a vehicle collision mitigation system according to claim 8, further comprising wherein the trigger borders are defined by lines parallel with the longitudinal symmetry line of the vehicle and the adjustable trigger width is the distance between the trigger borders.

* * * * *